(12) United States Patent
Maeda et al.

(10) Patent No.: US 7,210,840 B2
(45) Date of Patent: May 1, 2007

(54) ROD-SHAPED LIGHT TRANSMISSION BODY, ILLUMINATING DEVICE, AND LIQUID CRYSTAL DISPLAY DEVICE

(75) Inventors: Satoshi Maeda, Kawasaki (JP); Hirokazu Aritake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 77 days.

(21) Appl. No.: 11/093,033

(22) Filed: Mar. 30, 2005

(65) Prior Publication Data

US 2006/0139950 A1    Jun. 29, 2006

(30) Foreign Application Priority Data

Dec. 28, 2004   (JP)  .............................. 2004-378566

(51) Int. Cl.
*F21V 7/04* (2006.01)

(52) U.S. Cl. ...................... 362/626; 362/621; 362/625; 362/628; 362/561; 362/558; 362/330; 362/331

(58) Field of Classification Search ................ 362/621, 362/626, 625, 628, 561, 558, 330, 331
See application file for complete search history.

(56) References Cited

U.S. PATENT DOCUMENTS

| | | | |
|---|---|---|---|
| 6,356,391 B1 | 3/2002 | Gardiner et al. | |
| 6,820,991 B2 * | 11/2004 | Wakaki et al. | 362/27 |
| 6,971,782 B2 * | 12/2005 | Nagakubo et al. | 362/625 |
| 7,014,347 B2 * | 3/2006 | Okuwaki | 362/555 |
| 2002/0172032 A1 | 11/2002 | Munro et al. | |

FOREIGN PATENT DOCUMENTS

| | | |
|---|---|---|
| EP | 0 819 970 A1 | 1/1998 |
| EP | 1 367 430 A2 * | 12/2003 |
| JP | 7-325208 | 12/1995 |
| JP | 10-214035 | 8/1998 |
| JP | 2003-77326 | 3/2003 |
| JP | 2003-511735 | 3/2003 |
| KR | 2003-0019064 A | 3/2004 |
| WO | WO 2004/051140 A1 | 6/2004 |

OTHER PUBLICATIONS

European Search Report dated Dec. 22, 2005.
Office Action dispatched Jul. 28, 2006 issued in corresponding Korean application KR 10-2005-33357.

* cited by examiner

*Primary Examiner*—Renee Luebke
*Assistant Examiner*—Jessica L. McMillan
(74) *Attorney, Agent, or Firm*—Westerman, Hattori, Daniels & Adrian, LLP.

(57) ABSTRACT

A rod-shaped light transmission body that has a plurality of prisms and converts light incident from a light source to linear light through the prisms to output the linear light, the prisms including a first prism having a function of totally reflecting the incident light to output the light from the rod-shaped light transmission body, and second and third prisms that are positioned on both sides of the first prism, each of the second and the third prisms having a function of transmitting and deflecting the incident light.

20 Claims, 12 Drawing Sheets

ROD-SHAPED LIGHT TRANSMISSION BODY, ILLUMINATING DEVICE, AND LIQUID CRYSTAL DISPLAY DEVICE

CROSS-REFERENCE TO RELATED APPLICATIONS

This application is based upon and claims the benefit of priority from the prior Japanese Patent Application No. 2004-378566, filed on Dec. 28, 2004, the entire contents of which are incorporated herein by reference.

BACKGROUND OF THE INVENTION

1) Field of the Invention

The present invention relates to a liquid crystal display device using an illuminating device constituted of a rod-shaped light transmission body and a planer light transmission body, and in particular to a rod-shaped light transmission body having a plurality of prisms.

2) Description of the Related Art

Recently, a liquid crystal display element and a liquid crystal display device used in an information terminal are required to provide high display quality such as colorization, high luminance, or high resolution. Since the liquid crystal display element is thin and light, it is widely used as a display unit for a portable type information terminal.

Figure 11:
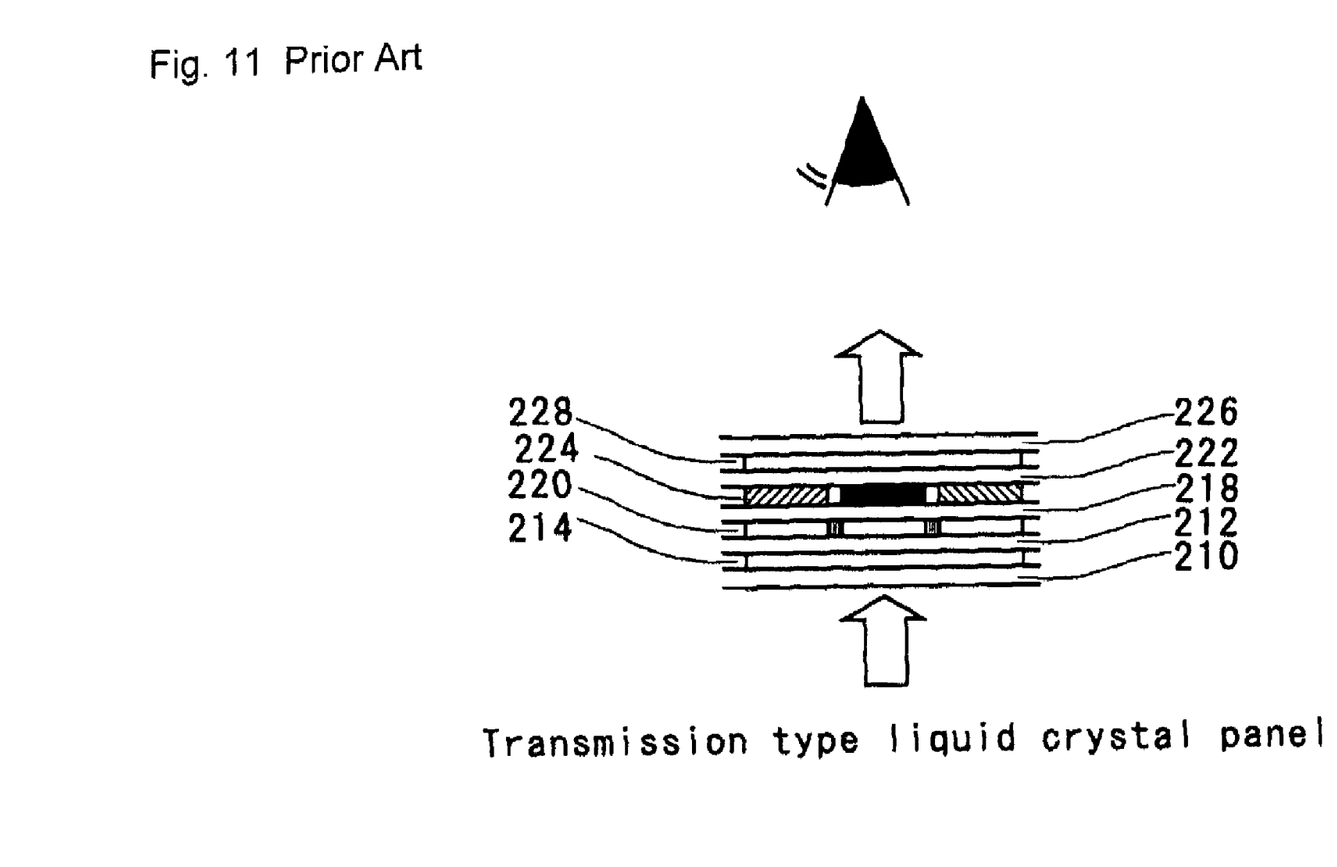
FIG. 11 is a sectional view showing a conventional transmission type liquid crystal panel.

FIG. 11 is a sectional view showing a conventional transmission type liquid crystal panel. As shown in FIG. 11, the transmission type liquid crystal panel has a polarizer 214 interposed between a glass base plate 210 and a glass base plate 212. A bus line or the like is formed on the glass base plate 212. Liquid crystal 220 is sealed between the glass base plate 212 and a glass base plate 218. Further, a color filter 224 is interposed between the glass base plate 218 and a glass base plate 222. A polarizer 228 is interposed between the glass base plate 222 and a glass base plate 226.

In the transmission type liquid crystal panel, the color filter and the liquid crystal are sandwiched between the polarizers, and in a reflection type liquid crystal panel, the polarizer 214 is replaced by a reflecting plate such as a mirror. In each of the liquid crystal panels, when linearly polarized light passes through the liquid crystal, a phase thereof is modulated due to characteristics of the liquid crystal, and the modulated light passes through the color filter to pass through the polarizer or be reflected by the polarizer, thereby performing white and back display. Character information or image information is constituted by arranging a plurality of while and black dots. On the other hand, since the liquid crystal itself is a light receiving element that does not emit light, it is difficult to view the information in the liquid crystal alone.

In order to solve the problem, an illuminating device as illuminating means is arranged on a back face of the transmission type liquid crystal panel or on a front face of the reflection type liquid crystal panel. Since the reflection type liquid crystal panel is illuminated by solar light or room light, an illuminating device is not required under such a condition. When the reflection type liquid crystal panel is not placed in an illuminating environment, an illuminating device like the transmission type liquid crystal panel is required. The illuminating device includes a point light source, a rod-shaped light transmission plate, and a planer light transmission body. Therefore, light emitted from such a point light source such as a LED is converted to a line light source by the rod-shaped light transmission plate, light from the line light source is incident on the planer light transmission plate, and the incident light illuminates a whole surface of the liquid crystal panel.

Patent Literature 1 (Japanese Patent Application Laid-Open No. H7-325208) discloses a technique of a liquid crystal display device provided with a prism sheet having at least two apex angle portions, slants of respective prism portions thereof being formed curvilinearly, apex angles being formed by the curved portions, and angles of the apex angle portions being different from one another.

Patent Literature 2 (Japanese Patent Application Laid-Open No. H10-214035) discloses a technique of a back light device having a prism sheet including a plurality of triangular prisms with different apex angles, at least one of the apex angles being in a range of 80° to 100°, and a liquid crystal display device using the back light device.

Patent Literature 3 (Japanese Patent Application National Publication (Laid-Open) No. 2003-511735) discloses a technique of forming an optical film provided with a polarizing prism array formed on an input face thereof which is useful for reducing or avoiding ripples (non-uniformity of luminance).

Patent Literature 4 (Japanese Patent Application Laid-Open No. 2003-77326) discloses a technique of an illuminating device that is provided with a light source that emits light, and a linear light transmission body that reflects light introduced from the light source by a plurality of light reflecting portions formed on an opposed side thereof from the light source and linearly outputs the light from a side thereof opposed to the opposed side for obtaining even light intensity, where faces of the light reflecting portions are respectively inclined at such angles that light is converged in the eyes of a viewer.

In view of the above problems, it is an object of the present invention to provide a rod-shaped light transmission body that has a simple constitution and is realized with a low cost, an illuminating device that provides sufficient brightness using the rod-shaped light transmission body, and a liquid crystal display device using the illuminating device.

SUMMARY OF THE INVENTION

Figure 12:
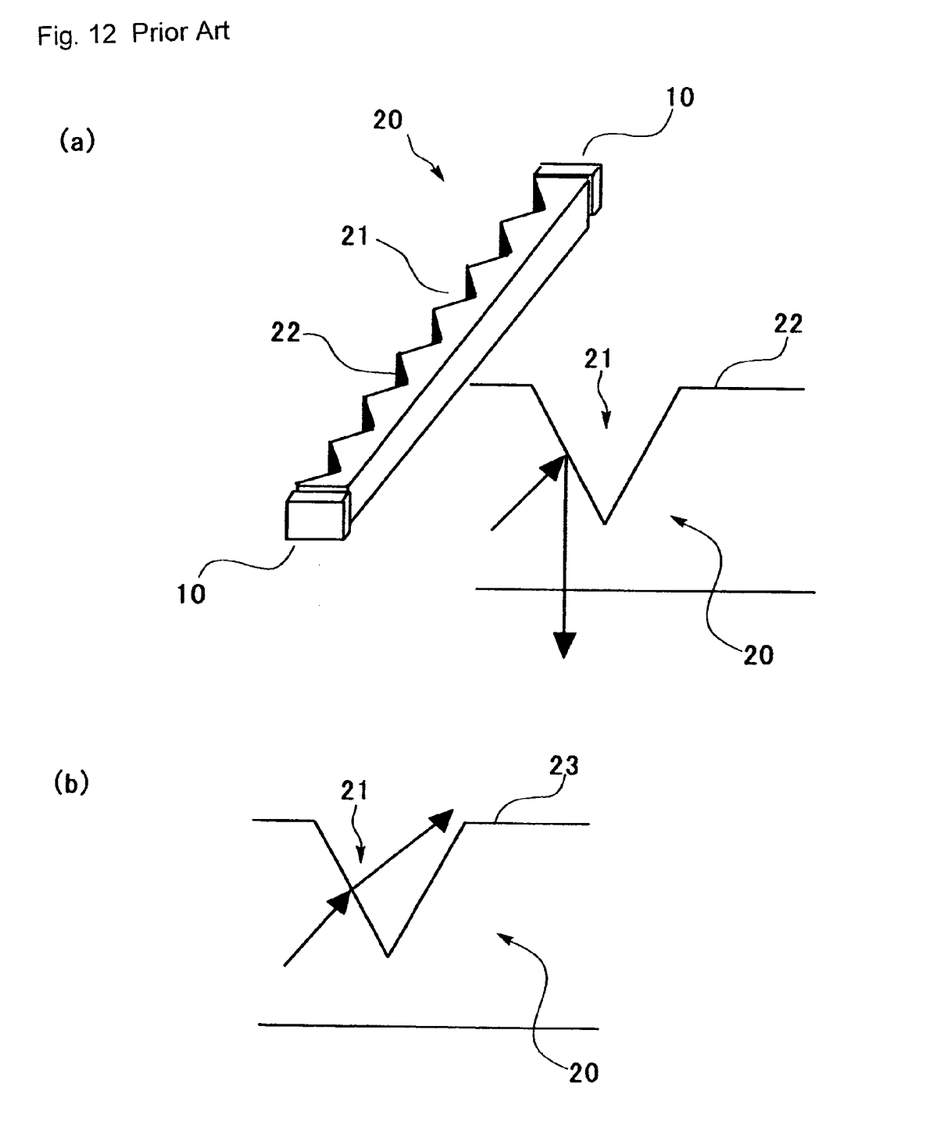
FIGS. 12A and 12B are views showing a conventional rod-shaped light transmission plate.

Conventionally, in order to convert light from a point light source to a linear light source efficiently to illuminate a planer light transmission plate, it is necessary to provide an aluminum coat for reflection on a rod-shaped light transmission plate that converts light from the point light source to a linear light source. Since it is necessary to provide the aluminum coat for reflection on the rod-shaped light transmission plate, a manufacturing process therefor is also required, which results in difficulty in cost reduction. FIGS. 12A and 12B are views showing a conventional rod-shaped light transmission plate. As shown in FIG. 12A, when the rod-shaped light transmission plate is applied with an aluminum coat for reflection, light is reflected at a desired angle. On the other hand, as shown in FIG. 12B, when an aluminum coat for reflection is not applied to the light transmission plate in view of a low cost, since light passes through a prism constituted on the rod-shaped light transmission plate so that the light is not emitted from a desired light-outputting face of the rod-shaped light transmission plate at a desired angle, output light with a sufficient intensity can not be obtained.

In order to solve the above problems, the present invention has the following features.

A rod-shaped light transmission body according to the present invention has a prism group converting light incident from a light source to linear light to output the linear light, wherein the prism group includes a first prism having a function of totally reflecting the incident light to output the light from the rod-shaped light transmission body, and a plurality of prisms that are positioned on both sides of the first prism, each prism having a function of transmitting and deflecting the incident light. Thus, a linear light can be output from the light-outputting face of the rod-shaped light transmission body at a desired angle.

An illuminating device according to the present invention includes a light source, a rod-shaped light transmission body that has a prism group converting light incident from the light source to linear light to output the linear light, and a planer light transmission body that outputs linear light incident from the rod-shaped light transmission body from a planer light-outputting face thereof in a planer manner, wherein the prism group of the rod-shaped light transmission body includes a first prism having a function of totally reflecting the incident light to output the light from the rod-shaped light transmission body, and a plurality of prisms that are positioned on both sides of the first prism, each prism having a function of transmitting and deflecting the incident light.

A liquid crystal display device according to the present invention has an illuminating device including a light source, a rod-shaped light transmission body that has a prism group converting light incident from the light source to linear light to output the linear light, and a planer light transmission body that outputs the linear light incident from the rod-shaped light transmission body from a planer light-outputting face thereof in a planer manner, and a liquid crystal panel, wherein the prism group of the rod-shaped light transmission body includes a first prism having a function of totally reflecting the incident light to output the light from the rod-shaped light transmission body and a plurality of prisms that are positioned on both sides of the first prism, each prism having a function of transmitting and deflecting the incident light. By so constituting a reflection type or a transmission type liquid crystal display device, a liquid crystal display device that has an even light distribution and high luminance can be obtained.

DETAILED DESCRIPTION OF THE PREFERRED EMBODIMENTS

Exemplary embodiments of the present invention will be explained below with reference to the drawings. Changes and modifications can be appropriately made to the embodiments within the scope of the gist of the present invention by those skilled in the art. Note that the present invention is not limited to the following embodiments.

Figure 1:
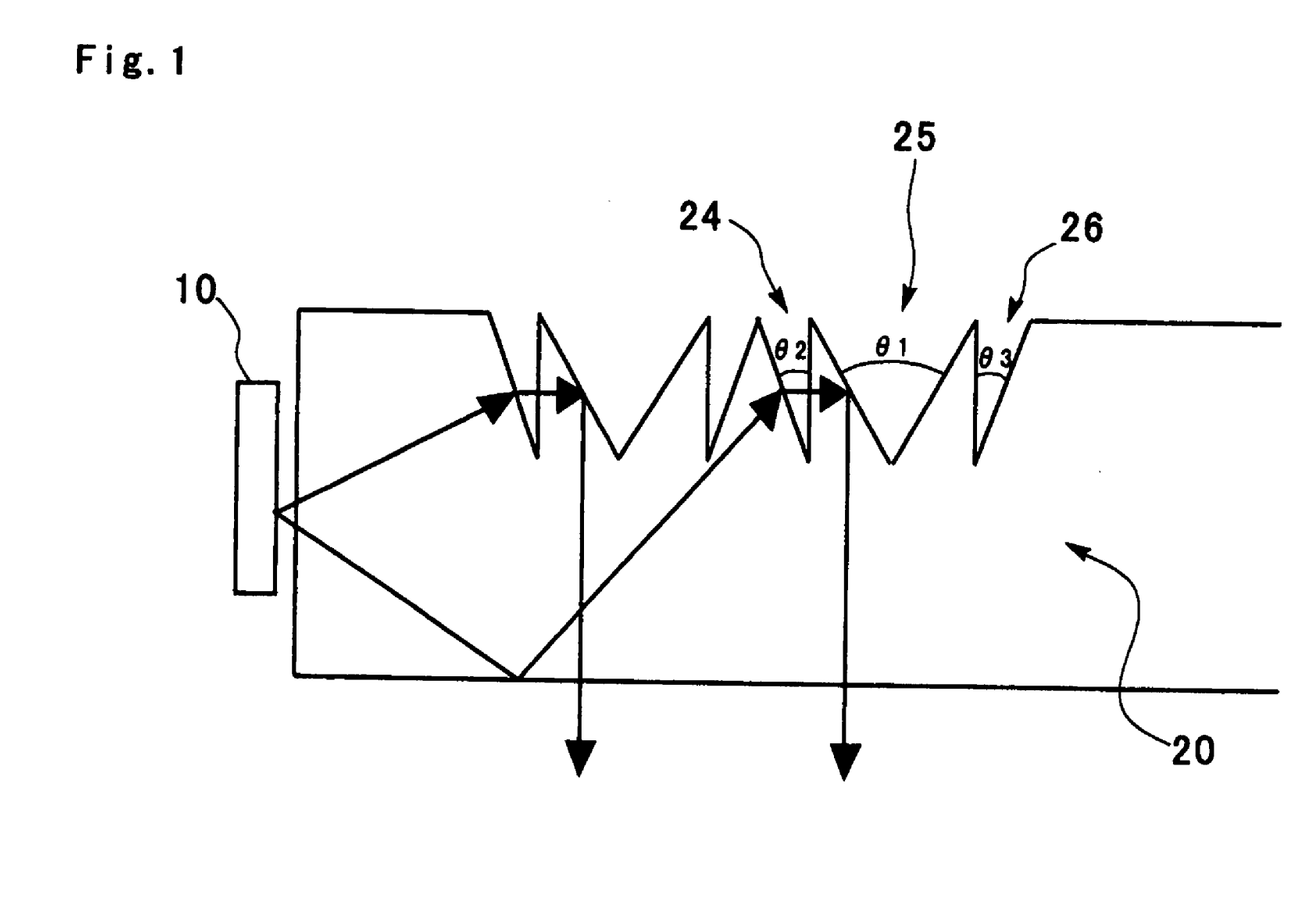
FIG. 1 is a view showing an embodiment of a rod-shaped light transmission body according to the present invention.

FIG. 1 is a view showing an embodiment of a rod-shaped light transmission body according to the present invention. As shown in FIG. 1, a rod-shaped light transmission body 20 includes a plurality of prism groups, each prism group including three prisms of a first prism 25 that has a function of totally reflecting incident light to output the same from the rod-shaped light transmission body 20, and second and third prisms 24 and 26 that are positioned on both sides on the first prism 25, each having a function of transmitting and deflecting the incident light.

Light from a LED light source 10 positioned at one end of the rod-shaped light transmission body 20 first enters a first face of the second prism 24 that transmits and deflects the incident light. The incident light is deflected approximately in parallel to a longitudinal direction of the rod-shaped light transmission body 20 by refraction to output the same to outside the rod-shaped light transmission body 20. The light which has once been output to outside the rod-shaped light transmission body 20 enters a second face of the second prism 24 that transmits and deflects the incident light. Since the second face is constituted at an angle of about 90° to the longitudinal direction of the rod-shaped light transmission body 20, light is hardly influenced by refraction to re-enter the rod-shaped light transmission body 20 while remaining approximately parallel to the longitudinal direction of the rod-shaped light transmission body 20. The re-entered light is totally reflected by a first face of the first prism 25 to be output to outside the rod-shaped light transmission body 20. Similarly, light from an LED light source at the other end of the rod-shaped light transmission body 20 is output from the rod-shaped light transmission body 20 by utilizing the third prism 26 and the first prism 25.

In order to keep a light intensity distribution even in the illuminating device, it is desirable that light output from the rod-shaped light transmission body 20 is output approximately vertically thereto. Accordingly, in the embodiment according to the present invention, apex angles θ2 of the second prisms 24 that transmit and reflect light output from the rod-shaped light transmission body 20 to become vertical to the rod-shaped light transmission body 20, and apex angles θ1 of the first prisms 25 having a function of outputting the incident light from the rod-shaped light transmission body 20 are changed according to their positions from the light source at the end of the rod-shaped light transmission body 20.

Figure 2:
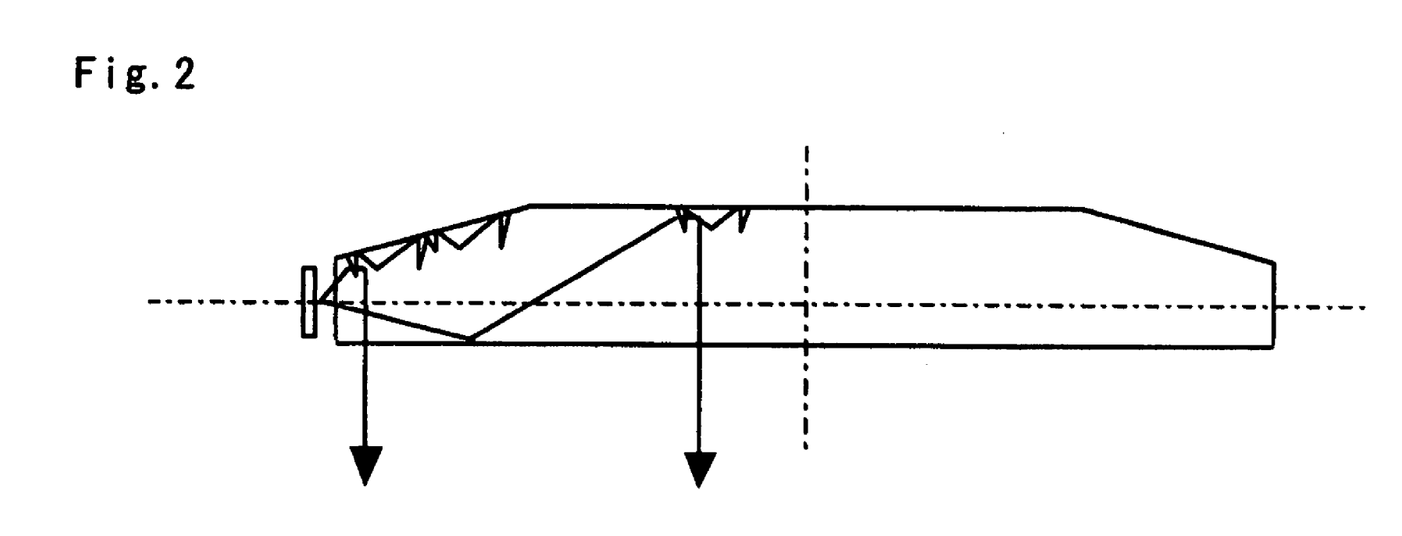
FIG. 2 is a view showing an embodiment where a face of the rod-shaped light transmission body that has a plurality of prisms is formed in a convex shape.

FIG. 2 is a view showing an embodiment where a face of the rod-shaped light transmission body that has a plurality of prisms is formed in a convex shape. When the convex shape is not adopted for the rod-shaped light transmission body, light from the LED light source is often converged at an end of the rod-shaped light transmission body near to the LED light source by refraction so that the end tends to be darker than a central portion of the rod-shaped light transmission body 20 which light directly hits, and another end of the rod-shaped light transmission body positioned far from the LED light source tends to be darker than the central portion due to a long distance from the light source. Accordingly, by forming the face of the rod-shaped light transmission body in a convex shape, the distance between the light source and the far side end of the rod-shaped light transmission body can be shortened and more light can be converged at the far side end, so that brightness from the end to the vicinity of the central portion of the rod-shaped light transmission body can be made more even. Even when the face of the rod-shaped light transmission body is formed in the convex shape, the rod-shaped light transmission body 20 has three prisms of the first prism 25 that has a function of totally reflecting the incident light to output the same from the rod-shaped light transmission body 20, and the second and the third prisms 24 and 26 that are positioned on both sides on the first prism 25, each having a function of transmitting and deflecting the incident light.

Figure 3:
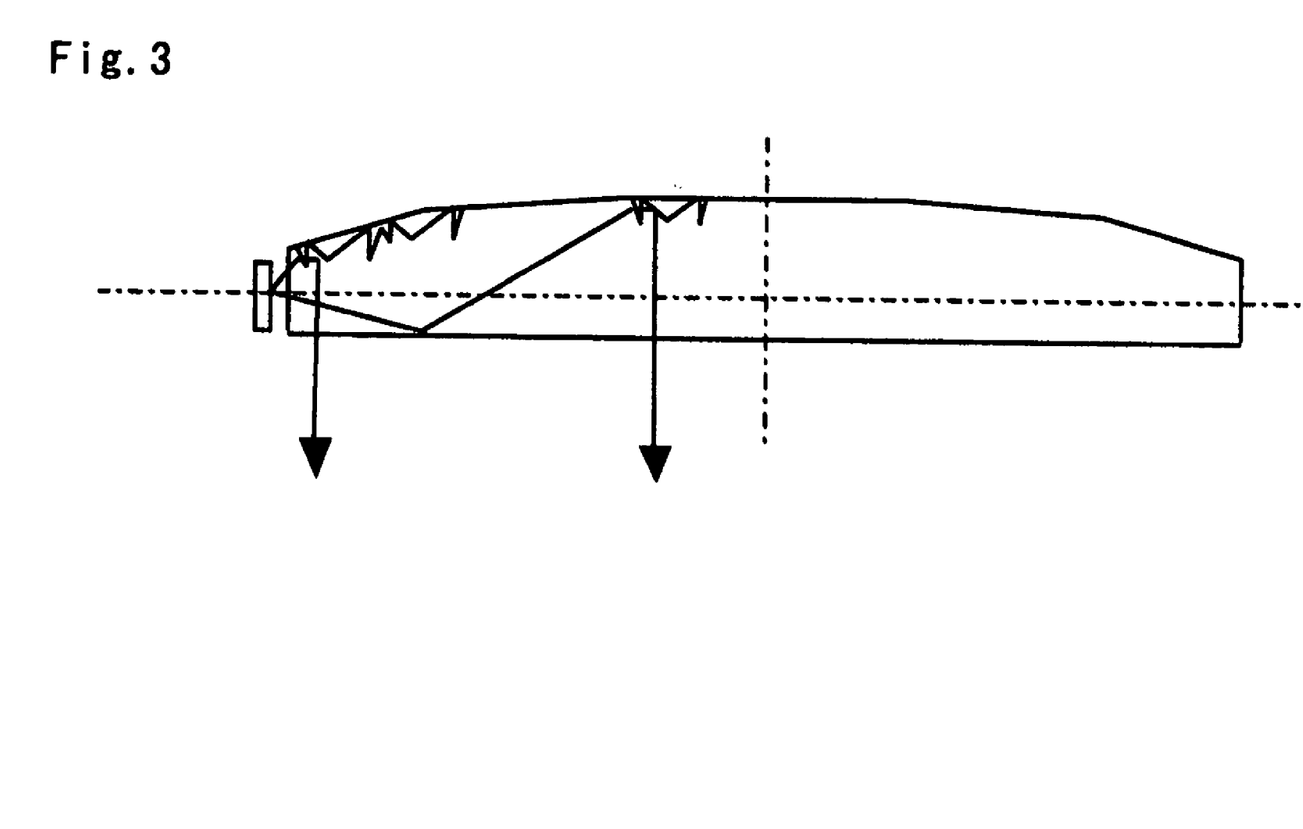
FIG. 3 is a view showing an embodiment where the convex shape of the face of the rod-shaped light transmission body that has the prisms is formed in a polygonal shape by combining straight lines.

FIG. 3 is a view showing an embodiment where the convex shape of the face of the rod-shaped light transmission body that has the prisms which is shown in FIG. 2 is formed in a polygonal shape by combining straight lines. By forming the convex shape in a polygonal shape, the distance between the end portion of the rod-shaped light transmission body and the light source can be adjusted finely, so that display quality can be further improved as compared with that in the embodiment shown in FIG. 2. Working for obtaining the convex shape becomes easy since it is the combination of straight lines.

Figure 4:
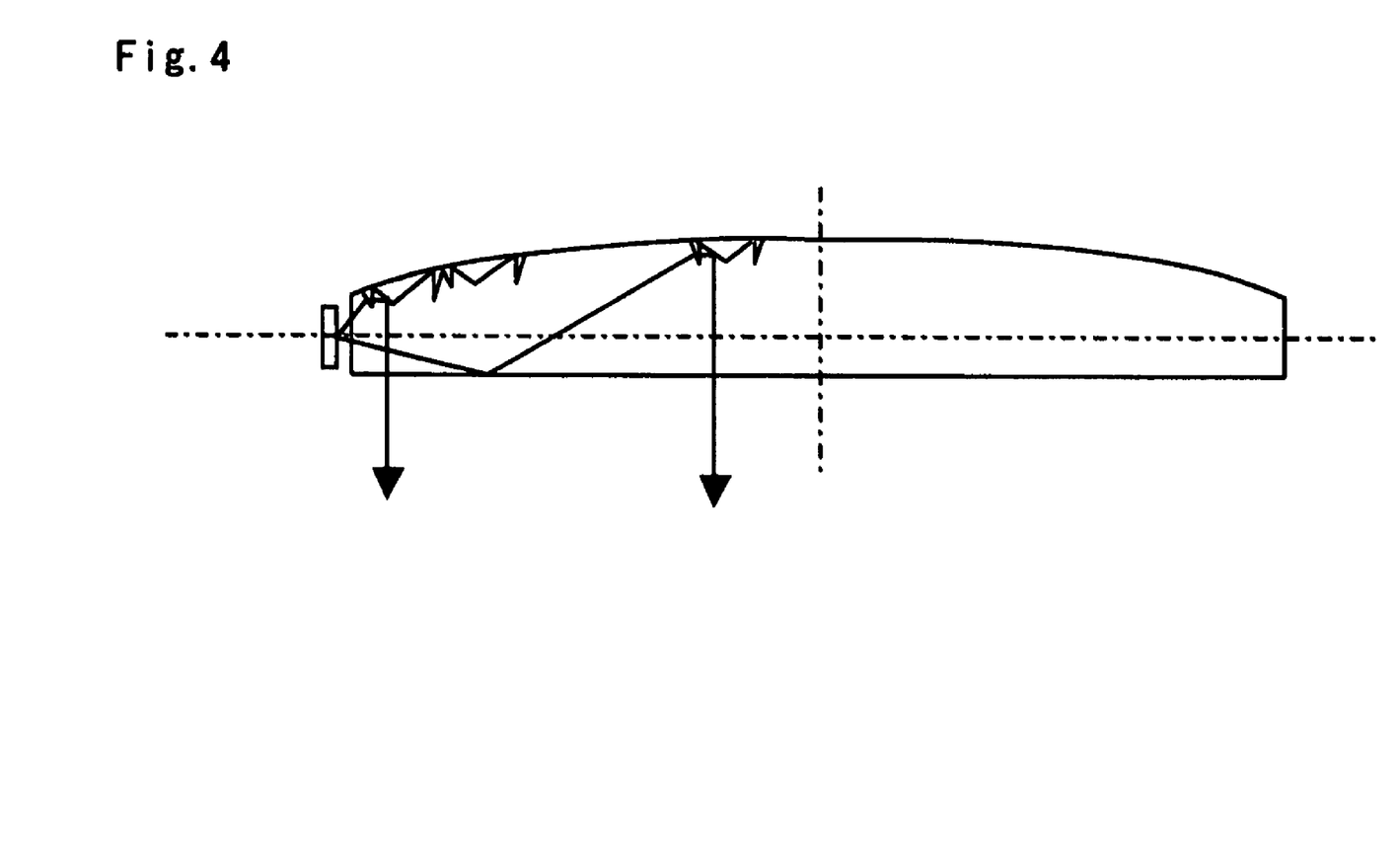
FIG. 4 is a view showing an embodiment where the convex shape of the face of the rod-shaped light transmission body that has the prisms is formed in a curved surface shape.

FIG. 4 is a view showing an embodiment where the convex shape of the face of the rod-shaped light transmission body that has the prisms which is shown in FIG. 2 is formed in a curved surface shape. By forming the convex shape in the curved surface shape, a smooth contour can be obtained, so that display quality can be further improved as compared with that in the embodiment shown in FIG. 3. The term "curved surface shape" includes a shape where a connecting point of straight lines is made smooth or rounded, and further includes an aspherical shape or the like.

Figure 5:
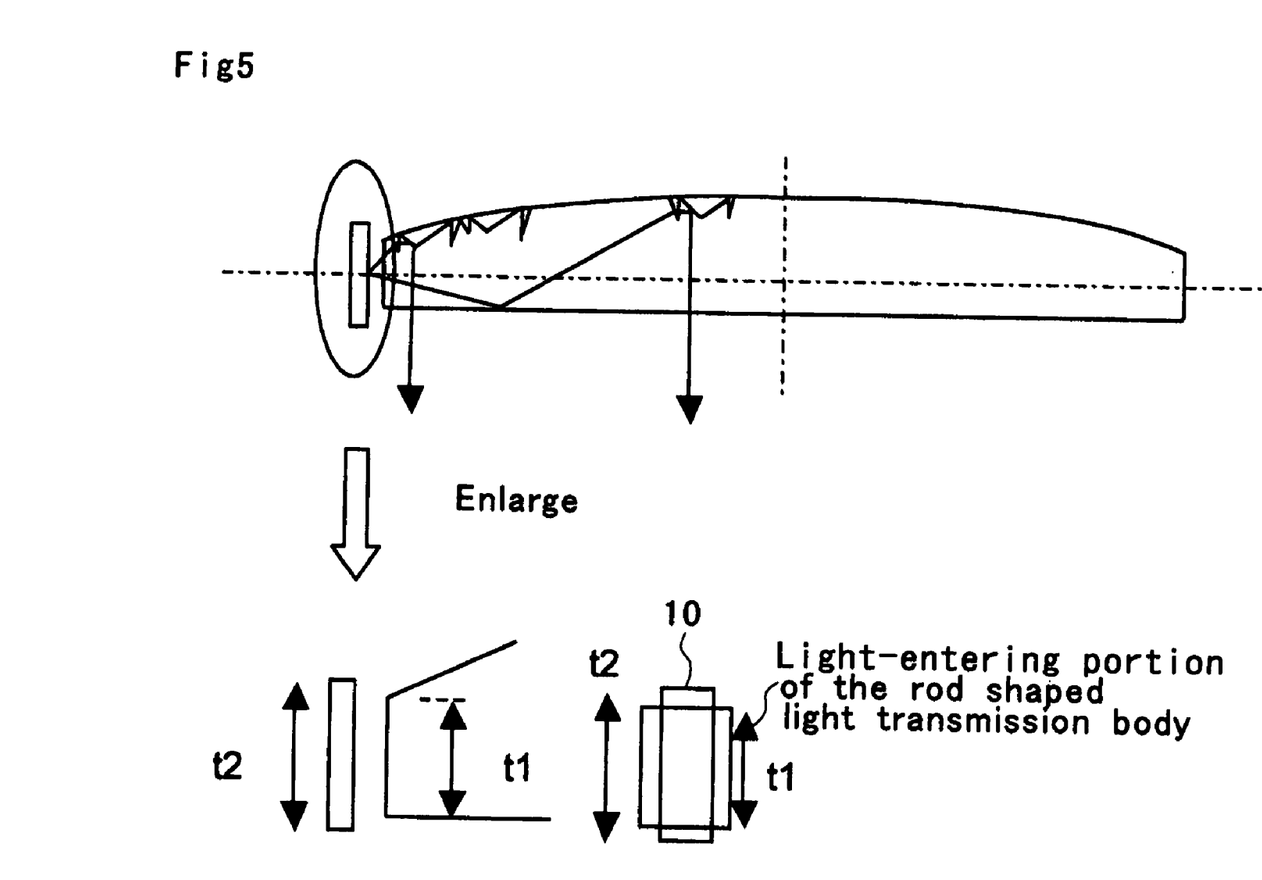
FIG. 5 is a view showing an embodiment where a size of a face of the rod-shaped light transmission body into which light from a light source enters is smaller than a size of the light source in a longitudinal direction thereof.
Figure 6:
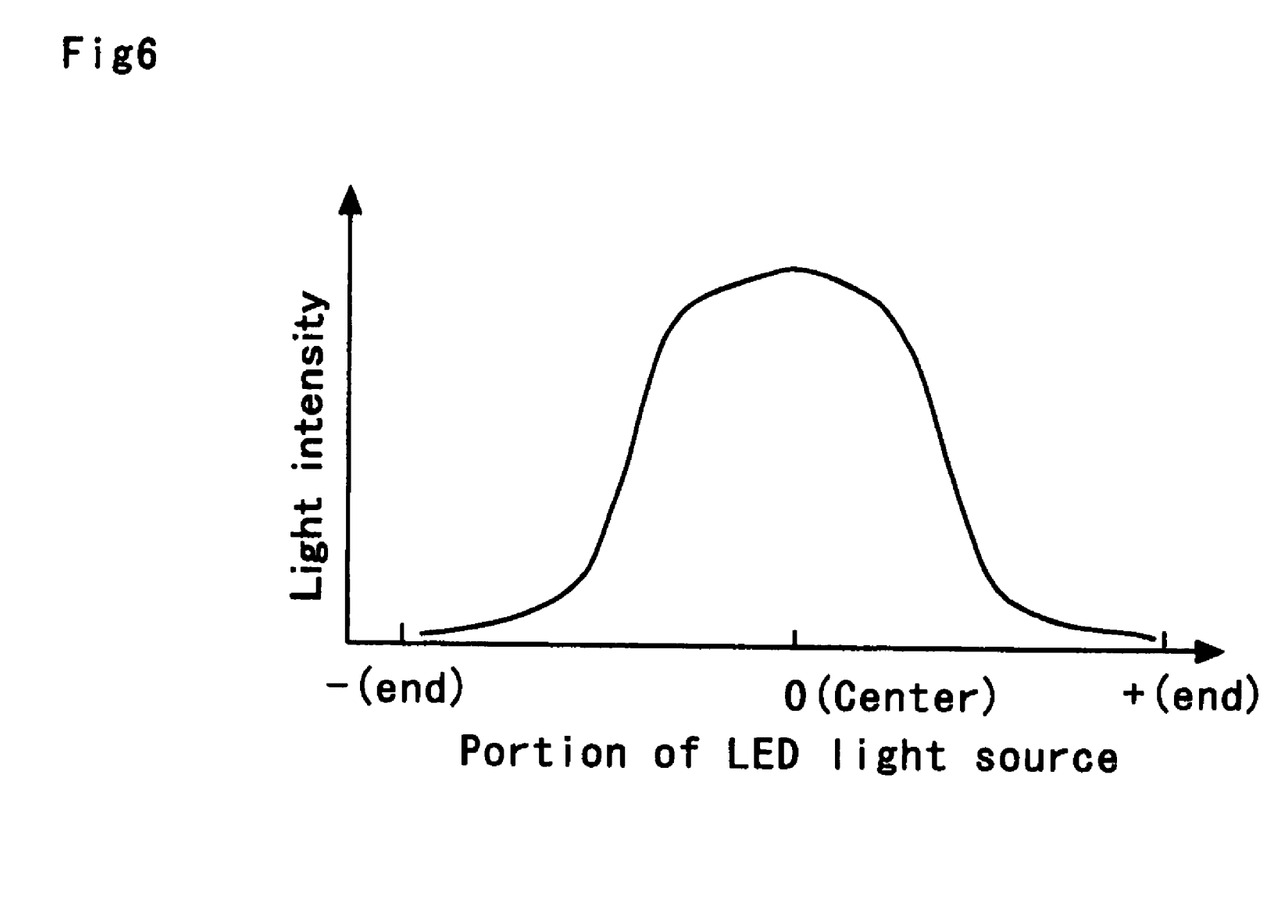
FIG. 6 is a graph showing a light intensity distribution of an LED light source.

FIG. 5 is a view showing an embodiment where a size of a face of the rod-shaped light transmission body into which light from a light source enters is smaller than a size of the light source in a longitudinal direction thereof. When the size of a light-entering portion of the rod-shaped light transmission body 20 in a longitudinal direction thereof is represented as t1, and the size of the light source in a longitudinal direction thereof is represented as t2, a relationship of t1<t2 is obtained. FIG. 6 is a graph showing a light intensity distribution of the LED light source. For example, when the LED light source is used, the LED light source has generally a light intensity distribution as shown in FIG. 6, and the whole surface of a light-emitting face is not bright. Accordingly, even if a light-entering face of the rod-shaped light transmission body 20 is made small, brightness is not lowered. Thus, by setting a bright portion of the LED as the light-entering face of the rod-shaped light transmission body 20, brightness can be made even further effectively.

Figure 7:
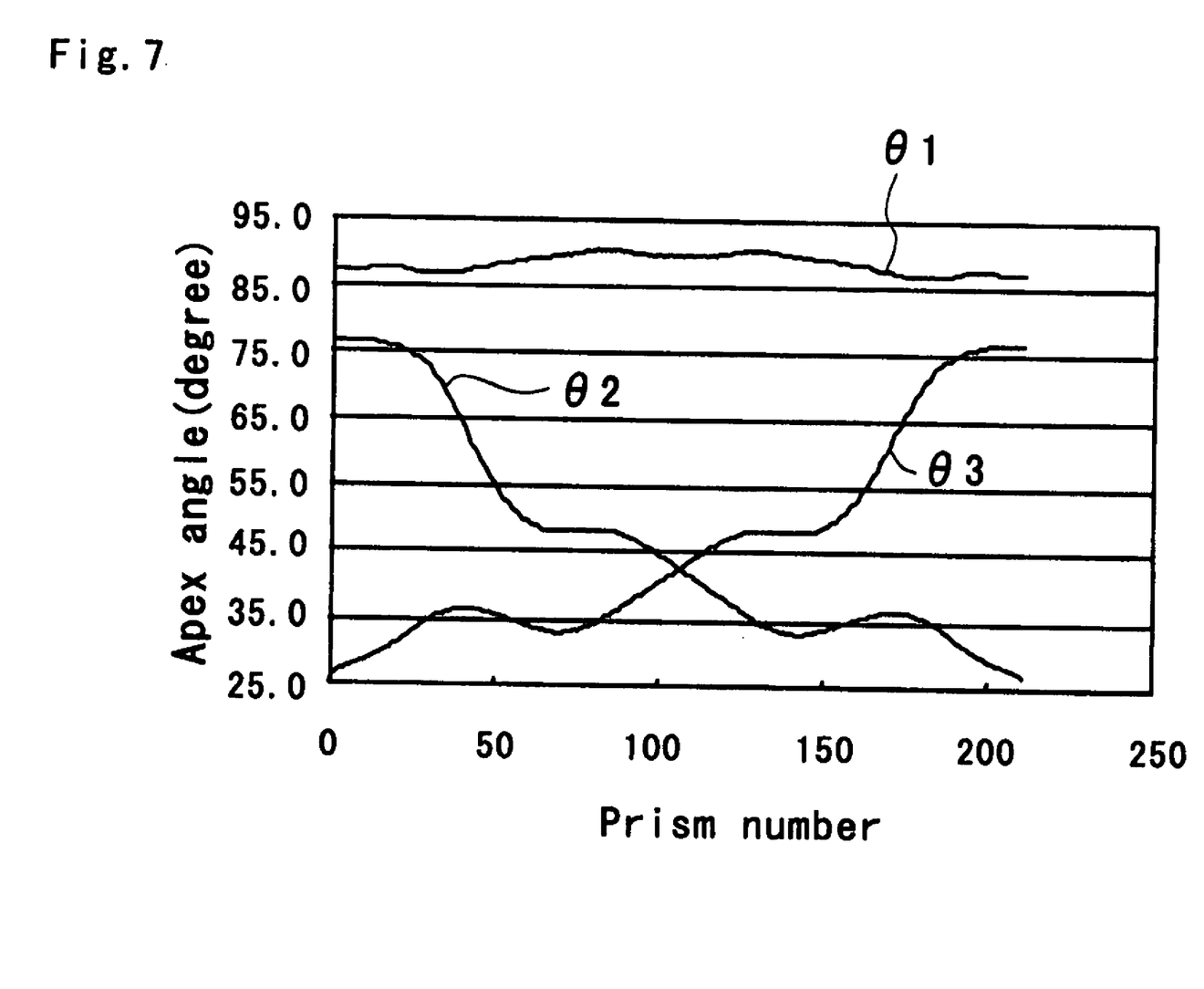
FIG. 7 is a graph showing changes of first, second, and third prisms in the rod-shaped light transmission body according to the present invention.

FIG. 7 is a graph showing changes of apex angles of the first, the second, and the third prisms in the rod-shaped light transmission body according to the present invention. In FIG. 7, prism numbers are attached to respective prism groups, each group including the first prism 25, the second prism 24, and the third prism 26. The rod-shaped light transmission body 20 according to the embodiment includes about 200 prism groups. The rod-shaped light transmission body 20 according to the present invention is implemented in an illuminating optical system of about 2 inches, where changes of apex angles $\theta1$, $\theta2$, and $\theta3$ of the first, the second, and the third prisms are shown. It is understood from FIG. 7 that the apex angles $\theta2$ and $\theta3$ of the second and the third prisms change from about 25° to about 80°, and the apex angle $\theta1$ of the first prism 25 changes from about 85° to about 93° corresponding to the changes of the apex angles $\theta2$ and $\theta3$. Since a prism portion of the rod-shaped light transmission body 20 has a symmetrical shape about the center of the rod-shaped light transmission body 20 in its longitudinal direction, manufacturing of a mold for forming a rod-shaped light transmission body becomes easy.

Figure 8:
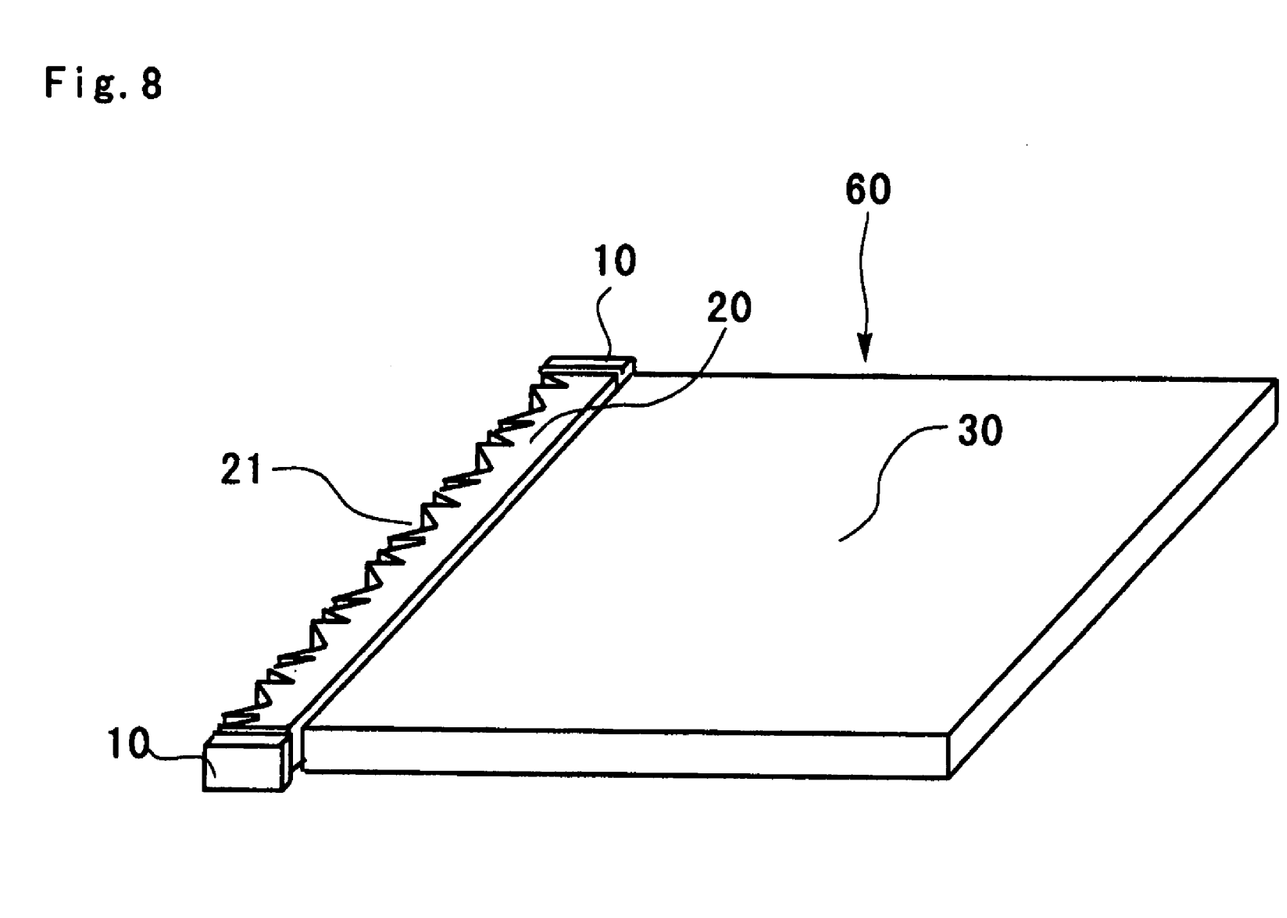
FIG. 8 is a perspective view showing an illuminating device using the rod-shaped light transmission body according to the present invention.

FIG. 8 is a perspective view showing an illuminating device using a rod-shaped light transmission body according to the present invention. As shown in FIG. 8, the rod-shaped light transmission body 20 according to the present invention is combined with a planar light transmission body 30. Lights emitted from LED light sources positioned at both ends of the rod-shaped light transmission body can be used as a linear light source for the illuminating device 60 using the rod-shaped light transmission body 20 according to the present invention. Reference character 21 denotes a prism. Thus, an illuminating device having an even brightness distribution and a high luminance can be provided at a low cost.

Figure 9:
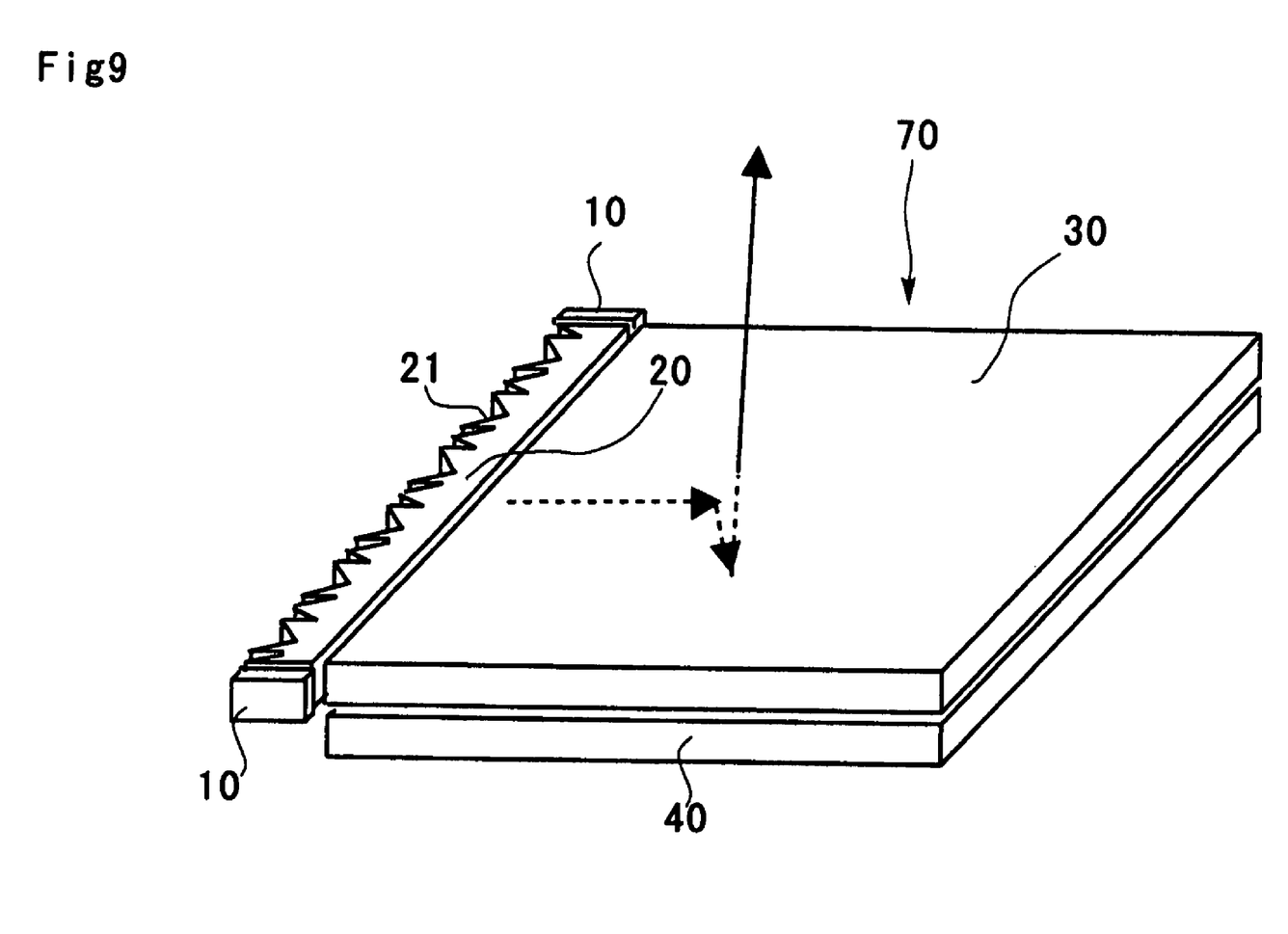
FIG. 9 is a perspective view showing an embodiment of a liquid crystal display device using a reflection type liquid crystal panel.

FIG. 9 is a perspective view showing an embodiment of a liquid crystal display device using a reflection type liquid crystal panel. As shown in FIG. 9, the liquid crystal display device 70 is a reflection type liquid crystal display device 40 where an illuminating device is constituted by combining the rod-shaped light transmission body 20 according to the present invention and the planer light transmission body 30 with each other, and the illuminating device is used as a front light.

Figure 10:
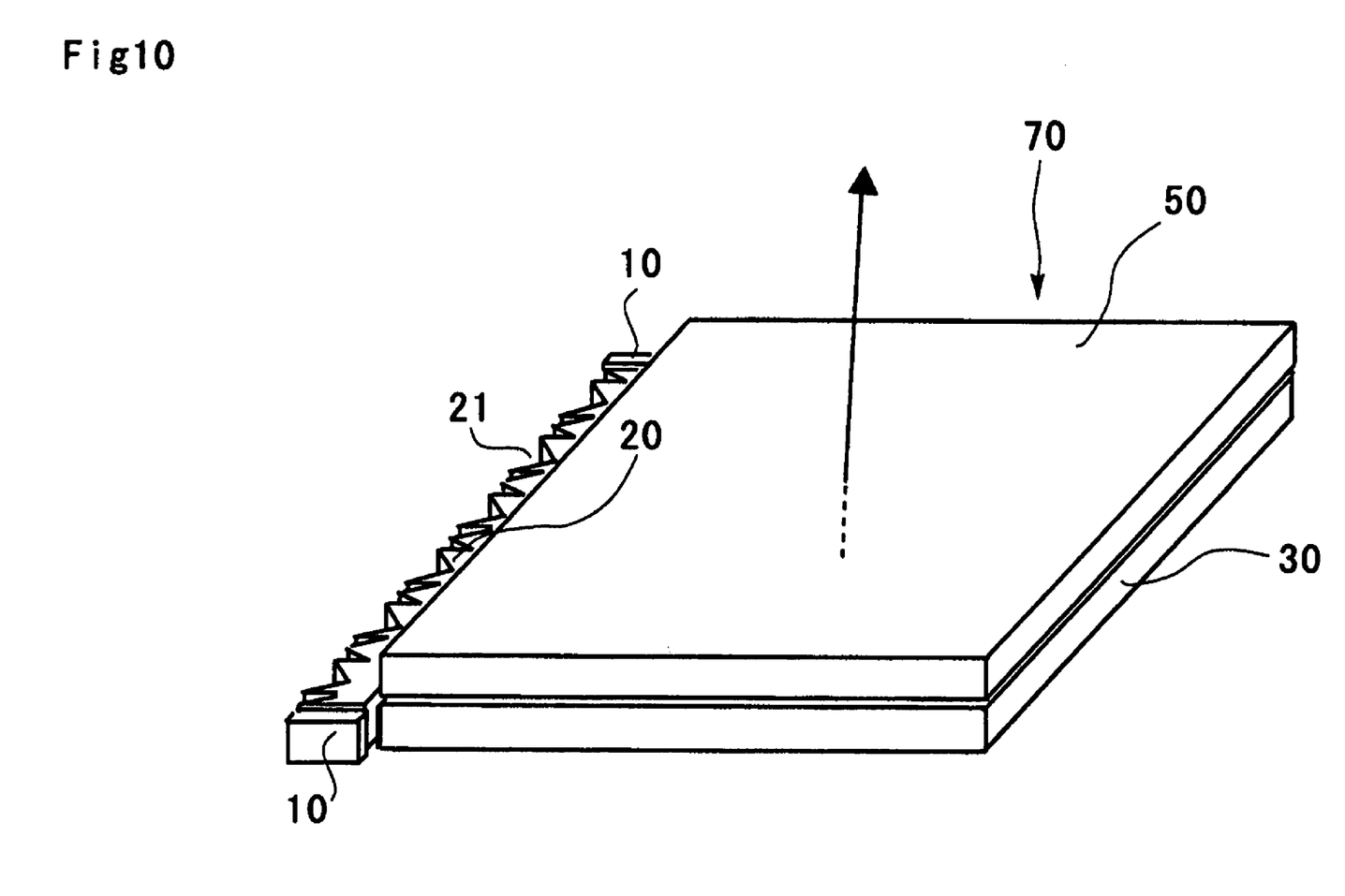
FIG. 10 is a perspective view showing an embodiment of a liquid crystal display device using a transmission type liquid crystal panel.

FIG. 10 is a perspective view showing an embodiment of a liquid crystal display device using a transmission type liquid crystal panel 50. As shown in FIG. 10, the liquid crystal display device is a transmission type liquid crystal display device where an illuminating device is constituted by combining the rod-shaped light transmission body 20 according to the present invention and the planer light transmission body 30 with each other, and the illuminating device is used as a back light.

By constituting the reflection type or the transmission type liquid crystal display device using the rod-shaped light transmission body 20 according to the present invention as the linear light source for a planar illumination optical system, a liquid crystal display device having an even brightness distribution and a high luminance can be provided at a low cost.

In FIGS. 1 to 10, the embodiments where the second prism 24 and the third prism 26 that are positioned on the both sides of the first prism 25 having a function of totally reflecting the incident light to output the same from the rod-shaped light transmission body 20 are each constituted of a single prism have been explained. However, each of the second prism and the third prism may be constituted of a plurality of prisms. Even so, it is only sufficient that each of the second and the third prisms has a function of transmitting and deflecting the incident light, and it is not necessarily constituted of a single prism.

According to the present invention, a rod-shaped light transmission body that realizes a low cost by a simple constitution without providing an aluminum coat for reflection or the like on the rod-shaped light transmission body, an illuminating device using the rod-shaped light transmission body to provide sufficient brightness, and a liquid crystal display device using the illuminating device can be provided.

What is claimed is:

1. A rod-shaped light transmission body including a plurality of prism groups, each group converting light incident from a light source to linear light to output the linear light, wherein
    each prism group comprises a first prism having a function of totally reflecting the incident light to output the light from the rod-shaped light transmission body, and
    a plurality of prisms that are positioned on both sides of the first prism, each prism having a function of transmitting and deflecting the incident light and having a second face at an angle of about 90° to the longitudinal direction of the rod-shaped light transmission body.

2. The rod-shaped light transmission body according to claim 1, wherein
    a face of the rod-shaped light transmission body that has the prism group is formed in a convex shape.

3. The rod-shaped light transmission body according to claim 1, wherein
    a face of the rod-shaped light transmission body that has the prism group is formed in a polygonal shape.

4. The rod-shaped light transmission body according to claim 1, wherein
    a face of the rod-shaped light transmission body that has the prism group is formed in a curved surface shape.

5. The rod-shaped light transmission body according to claim 1, wherein
    a size of a face of the rod-shaped light transmission body into which light from the light source enters is smaller than a size of the light source in a longitudinal direction thereof.

6. The rod-shaped light transmission body according to claim 1, wherein
    a size of a face of the rod-shaped light transmission body into which light from the light source enters is smaller than a size of the light source in a longitudinal direction thereof, and apex angles of the first prisms are from 85° to 93°.

7. The rod-shaped light transmission body according to claim 1, wherein
    a face of the rod-shaped light transmission body that has the prism group is formed in a convex shape, a size of a face of the rod-shaped light transmission body into which light from the light source enters is smaller than a size of the light source in a longitudinal direction thereof, and apex angles of the first prisms are from 85° to 93°.

8. The rod-shaped light transmission body according to claim 1, wherein
    a face of the rod-shaped light transmission body that has the prism group is formed in a polygonal shape, a size of a face of the rod-shaped light transmission body into which light from the light source enters is smaller than a size of the light source in a longitudinal direction thereof, and apex angles of the first prisms are from 85° to 93°.

9. The rod-shaped light transmission body according to claim 1, wherein
    a face of the rod-shaped light transmission body that has the prism group is formed in a curved surface shape, a size of a face of the rod-shaped light transmission body into which light from the light source enters is smaller than a size of the light source in a longitudinal direction thereof, and apex angles of the first prisms are from 85° to 93°.

10. An illuminating device comprising:
    a light source;
    a rod-shaped light transmission body that has a plurality of prism groups converting light incident from the light source to linear light to output the linear light; and
    a planer light transmission body that outputs the linear light incident from the rod-shaped light transmission body from a planer light-outputting face thereof in a planer manner, wherein
    each prism group of the rod-shaped light transmission body comprises a first prism having a function of totally reflecting the incident light to output the light from the rod-shaped light transmission body, and
    a plurality of prisms that are positioned on both sides of the first prism, each prism having a function of transmitting and deflecting the incident light and having a second face at an angle of about 90° to the longitudinal direction of the rod-shaped light transmission body.

11. A rod-shaped light transmission body that has a prism group converting light incident from a light source to linear light to output the linear light, wherein
    the prism group comprises a first prism having a function of totally reflecting the incident light to output the light from the rod-shaped light transmission body, and second and third prisms that are positioned on both sides of the first prism, each of the second and the third prisms having a function of transmitting and deflecting the incident light and having a second face at an angle of about 90° to the longitudinal direction of the rod-shaped light transmission body.

12. An illuminating device comprising:
    a light source;
    a rod-shaped light transmission body that has a plurality of prism groups converting light incident from the light source to linear light to output the linear light; and
    a planer light transmission body that outputs the linear light incident from the rod-shaped light transmission body from a planer light-outputting face thereof in a planer manner, wherein
    each prism group of the rod-shaped light transmission body comprises a first prism having a function of totally reflecting the incident light to output the light from the rod-shaped light transmission body, and
    second and third prisms that are positioned on both sides of the first prism, each of the second and the third prisms having a function of transmitting and deflecting the incident light and having a second face at an angle of about 90° to the longitudinal direction of the rod-shaped light transmission body.

13. A liquid crystal display device comprising:
    an illuminating device including a light source, a rod-shaped light transmission body that has a plurality of prism groups converting light incident from the light source to linear light to output the linear light, and a planer light transmission body that outputs the linear light incident from the rod-shaped light transmission body from a planer light-outputting face thereof in a planer manner, and a liquid crystal panel, wherein each prism group of the rod-shaped light transmission body comprises a first prism having a function of totally reflecting the incident light to output the light from the rod-shaped light transmission body and a plurality of prisms that are positioned on both sides of the first prism, each prism having a function of transmitting and deflecting the incident light and having a second face at an angle of about 90° to the longitudinal direction of the rod-shaped light transmission body.

14. A liquid crystal display device comprising:

an illuminating device including a light source, a rod-shaped light transmission body that has a plurality of prism groups converting light incident from the light source to linear light to output the linear light, and a planer light transmission body that outputs the linear light incident from the rod-shaped light transmission body from a planer light-outputting face thereof in a planer manner, and a liquid crystal panel, wherein each prism group of the rod-shaped light transmission body comprises a first prism having a function of totally reflecting the incident light to output the light from the rod-shaped light transmission body, and second and third prisms that are positioned on both sides of the first prism, each of the second and the third prisms having a function of transmitting and deflecting the incident light and having a second face at an angle of about 90° to the longitudinal direction of the rod-shaped light transmission body.

15. A rod-shaped light transmission body including a plurality of prism groups, each group converting light incident from a light source to linear light to output the linear light, wherein each prism group comprises a first prism having a function of totally reflecting the incident light to output the light from the rod-shaped light transmission body, and a plurality of prisms that are positioned on both sides of the first prism, each prism having a function of transmitting and deflecting the incident light and having a second face re-entered at an angle of approximately parallel to the longitudinal direction of the rod-shaped light transmission body.

16. A rod-shaped light transmission body that has a prism group converting light incident from a light source to linear light to output the linear light, wherein the prism group comprises a first prism having a function of totally reflecting the incident light to output the light from the rod-shaped light transmission body, and second and third prisms that are positioned on both sides of the first prism, each of the second and the third prisms having a function of transmitting and deflecting the incident light and having a second face re-entered at an angle approximately parallel to the longitudinal direction of the rod-shaped light transmission body.

17. An illuminating device comprising:

a light source;

a rod-shaped light transmission body that has a plurality of prism groups converting light incident from the light source to linear light to output the linear light; and a planer light transmission body that outputs the linear light incident from the rod-shaped light transmission body from a planer light-outputting face thereof in a planer manner, wherein each prism group of the rod-shaped light transmission body comprises a first prism having a function of totally reflecting the incident light to output the light from the rod-shaped light transmission body, and a plurality of prisms that are positioned on both sides of the first prism, each prism having a function of transmitting and deflecting the incident light and having a second face re-entered at an angle approximately parallel to the longitudinal direction of the rod-shaped light transmission body.

18. An illuminating device comprising:

a light source;

a rod-shaped light transmission body that has a plurality of prism groups converting light incident from the light source to linear light to output the linear light; and a planer light transmission body that outputs the linear light incident from the rod-shaped light transmission body from a planer light-outputting face thereof in a planer manner, wherein each prism group of the rod-shaped light transmission body comprises a first prism having a function of totally reflecting the incident light to output the light from the rod-shaped light transmission body, and second and third prisms that are positioned on both sides of the first prism, each of the second and the third prisms having a function of transmitting and deflecting the incident light and having a second face re-entered at an angle approximately parallel to the longitudinal direction of the rod-shaped light transmission body.

19. A liquid crystal display device comprising:

an illuminating device including a light source, a rod-shaped light transmission body that has a plurality of prism groups converting light incident from the light source to linear light to output the linear light, and a planer light transmission body that outputs the linear light incident from the rod-shaped light transmission body from a planer light-outputting face thereof in a planer manner, and a liquid crystal panel, wherein each prism group of the rod-shaped light transmission body comprises a first prism having a function of totally reflecting the incident light to output the light from the rod-shaped light transmission body and a plurality of prisms that are positioned on both sides of the first prism, each prism having a function of transmitting and deflecting the incident light and having a second face re-entered at an angle approximately parallel to the longitudinal direction of the rod-shaped light transmission body.

20. A liquid crystal display device comprising:

an illuminating device including a light source, a rod-shaped light transmission body that has a plurality of prism groups converting light incident from the light source to linear light to output the linear light, and a planer light transmission body that outputs the linear light incident from the rod-shaped light transmission body from a planer light-outputting face thereof in a planer manner, and a liquid crystal panel, wherein each prism group of the rod-shaped light transmission body comprises a first prism having a function of totally reflecting the incident light to output the light from the rod-shaped light transmission body, and second and third prisms that are positioned on both sides of the first prism, each of the second and the third prisms having a function of transmitting and deflecting the incident light and having a second face re-entered at an angle approximately parallel to the longitudinal direction of the rod-shaped light transmission body.

* * * * *